United States Patent
Gudipudi et al.

(10) Patent No.: US 8,537,716 B2
(45) Date of Patent: Sep. 17, 2013

(54) METHOD AND SYSTEM FOR SYNCHRONIZING ACCESS POINTS IN A WIRELESS NETWORK

(75) Inventors: Srinivas Gudipudi, Hyderabad (IN); Muralidhar Swarangi, Andhra Pradesh (IN); Prasad Pillutla, Andhra Pradesh (IN); Bharat Nadimpalli, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 1088 days.

(21) Appl. No.: 11/460,717

(22) Filed: Jul. 28, 2006

(65) Prior Publication Data

US 2008/0025321 A1   Jan. 31, 2008

(51) Int. Cl.
*H04L 12/28* (2006.01)
*G06F 15/177* (2006.01)

(52) U.S. Cl.
USPC .......... 370/254; 370/324; 370/338; 709/220; 709/223

(58) Field of Classification Search
USPC ................ 370/310, 331, 338, 328–329, 254; 455/410
See application file for complete search history.

(56) References Cited

U.S. PATENT DOCUMENTS

| | | | | |
|---|---|---|---|---|
| 6,496,862 B1 * | 12/2002 | Akatsu et al. | ................ | 709/224 |
| 6,847,620 B1 | 1/2005 | Meier | | |
| 6,950,628 B1 * | 9/2005 | Meier et al. | .................. | 455/41.2 |
| 6,970,459 B1 | 11/2005 | Meier | | |
| 7,356,009 B1 * | 4/2008 | Meier et al. | .................. | 370/338 |
| 7,420,942 B2 * | 9/2008 | Wang | ............................. | 370/329 |
| 7,443,809 B2 * | 10/2008 | Bajic | ............................ | 370/254 |
| 7,787,863 B2 * | 8/2010 | van de Groenendaal | ..... | 455/411 |
| 7,894,411 B2 * | 2/2011 | Adachi et al. | ................. | 370/338 |
| 7,961,645 B2 * | 6/2011 | Gudipudi et al. | ............. | 370/254 |
| 8,126,145 B1 * | 2/2012 | Tewari et al. | ................. | 380/255 |
| 8,417,257 B2 * | 4/2013 | Shankar et al. | ............... | 455/453 |
| 2004/0098350 A1 * | 5/2004 | Labrou et al. | ................... | 705/64 |
| 2004/0141617 A1 | 7/2004 | Volpano | | |
| 2005/0053046 A1 * | 3/2005 | Wang | ............................ | 370/338 |
| 2005/0180345 A1 | 8/2005 | Meier | | |
| 2005/0180358 A1 * | 8/2005 | Kolar et al. | .................... | 370/331 |
| 2005/0185626 A1 * | 8/2005 | Meier et al. | .................... | 370/338 |
| 2005/0201347 A1 * | 9/2005 | Abhishek et al. | ............. | 370/338 |
| 2005/0220054 A1 * | 10/2005 | Meier et al. | .................... | 370/331 |
| 2005/0232211 A1 * | 10/2005 | Abhishek et al. | ............. | 370/338 |
| 2006/0068799 A1 | 3/2006 | Morton et al. | | |
| 2006/0088020 A1 | 4/2006 | Gass | | |
| 2007/0081477 A1 * | 4/2007 | Jakkahalli et al. | ............ | 370/310 |
| 2007/0082654 A1 * | 4/2007 | Hovnanian et al. | ........... | 455/410 |
| 2007/0091861 A1 * | 4/2007 | Gupta et al. | ................... | 370/338 |
| 2007/0109983 A1 * | 5/2007 | Shankar et al. | ............ | 370/310.2 |
| 2007/0147318 A1 * | 6/2007 | Ross et al. | .................... | 370/338 |

(Continued)

*Primary Examiner* — Marsha D Banks Harold
*Assistant Examiner* — Christopher Wyllie
(74) *Attorney, Agent, or Firm* — Baker Botts, L.L.P.

(57) ABSTRACT

According to one embodiment of the invention, a method for synchronizing access points in a wireless network includes determining a service set identifier of a selected access point in the wireless network. The service set identifier identifies a name of a wireless connection. The method also includes determining an virtual local area network corresponding to the determined service set identifier. The virtual local area network is located in an extended service set. The extended service set includes a group of basic service sets. The method further includes identifying one or more access points located in the virtual local area network. The method further includes configuring the identified one or more access points to match a plurality of service parameters of the selected access point.

22 Claims, 2 Drawing Sheets

(56) References Cited

U.S. PATENT DOCUMENTS

| | | | |
|---|---|---|---|
| 2007/0160017 A1* | 7/2007 | Meier et al. | 370/338 |
| 2008/0002607 A1* | 1/2008 | Nagarajan et al. | 370/328 |
| 2008/0013481 A1* | 1/2008 | Simons et al. | 370/328 |
| 2008/0025321 A1* | 1/2008 | Gudipudi et al. | 370/395.53 |
| 2008/0049687 A1* | 2/2008 | Shankar et al. | 370/338 |
| 2009/0067326 A1* | 3/2009 | Perrot et al. | 370/230 |
| 2009/0252136 A1* | 10/2009 | Mahany et al. | 370/338 |
| 2011/0007724 A1* | 1/2011 | Mahany et al. | 370/338 |

* cited by examiner

METHOD AND SYSTEM FOR SYNCHRONIZING ACCESS POINTS IN A WIRELESS NETWORK

TECHNICAL FIELD OF THE INVENTION

This invention relates generally to wireless networks, and more particularly, to a method and system for synchronizing access points in a wireless network.

BACKGROUND OF THE INVENTION

In a wireless network, access points and endpoint devices may communicate with each other over a logically subdivided network, such as a virtual local area network. In such a network, some access points may be included in one logical partition and other access points may be included in another logical partition. The partitions strictly control access to network resources by establishing specific service parameters at the access points. As the wireless network grows in size and complexity, the management and control of these service parameters at the access points becomes more difficult.

OVERVIEW OF EXAMPLE EMBODIMENTS

According to one embodiment of the invention, a method for synchronizing access points in a wireless network includes determining a service set identifier of a selected access point in the wireless network. The service set identifier identifies a name of a wireless connection. The method also includes determining an virtual local area network corresponding to the determined service set identifier. The virtual local area network is located in an extended service set. The extended service set includes a group of basic service sets. The method further includes identifying one or more access points located in the virtual local area network. The method further includes configuring the identified one or more access points to match a plurality of service parameters of the selected access point.

Technical advantages of particular embodiments of the present invention include a method and system for synchronizing access points in a wireless network that accommodates seamless roaming of an endpoint device across various access points. Thus, a wireless user may roam across access points that overlap without losing connectivity, according to one embodiment.

Another technical advantage of particular embodiments of the present invention includes a method and system for synchronizing access points in a wireless network that automatically configures access points. Thus, access points in the wireless network provide equivalent services without manual updates to their configurations, according to one embodiment.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Embodiments of the present invention and its advantages are best understood by referring to FIGS. 1A through 3 of the drawings, like numerals being used for like and corresponding parts of the various drawings.

Figure 1A:
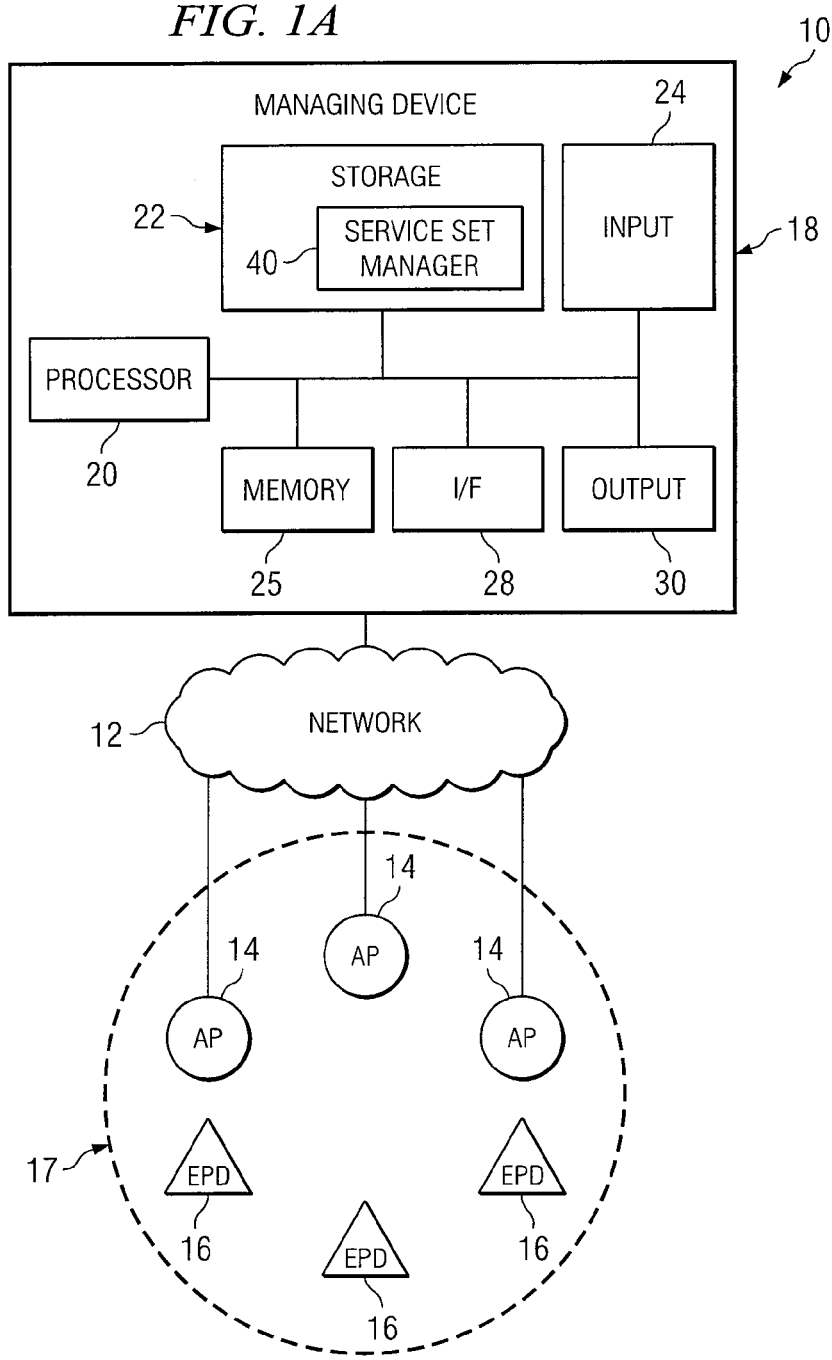
FIG. 1A is a block diagram illustrating a system for synchronizing access points in a wireless network according to the teachings of the invention.

FIG. 1A is a block diagram illustrating a system 10 for synchronizing access points in a wireless network according to the teachings of the invention. As shown in FIG. 1A, system 10 generally includes a network 12, one or more access points 14, one or more endpoint devices 16, a wireless network range 17, and a managing device 18. System 10 is particularly adapted for synchronizing the service parameters of access points to accommodate seamless roaming of endpoint devices.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Network 12 may utilize communication protocols and technologies to transmit packet flows. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, network 12 may utilize the IEEE 802.xx standards such as the IEEE 802.11 standards.

Access point 14 may be any network point suitable to couple an endpoint device, such as endpoint device 16, to a network, such as network 12. Access point 14 may be, for example, a session border controller, gatekeeper, call manager, conference bridge, router, hub, switch, gateway, edge point, or any other hardware or software operable to couple an endpoint device, such as endpoint device 16, to a network.

According to one embodiment of the invention, access point 14 may have a wired connection to network 12. According to another embodiment of the invention, access point 14 may have a wireless connection to network 12. According to yet another embodiment of the invention, access point 14 may include a receiver or transmitter or both a receiver and a transmitter. As an example, access point 14 may include an omni directional antenna operable to communicate with one or more endpoint devices.

Endpoint device 16 may refer to any suitable device operable to communicate with network 12 through a access point 14. Endpoint device 16 may execute with any of the well-known MS-DOS, PC-DOS, OS-2, MAC-OS, WINDOWS™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through access point 14.

Wireless network range 17 may refer to any suitable signal range for communications between access point 14 and endpoint device 16. In particular embodiments of the invention, communications between access point 14 and endpoint device 16 are communicated in wireless network range 17 according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPoL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Managing device 18 represents any device suitable to synchronize access points 14 in a wireless network. Although FIG. 1A provides one example of managing device 18 as operating within network 12, in other embodiments managing device 18 may operate as a wireless device connecting to network 12 through access point 14. Additional details of one example of managing device 18 are described in more detail below.

In various embodiments of the invention, network access for different classes of devices, such as endpoint device 16, may be provided by creating a logically subdivided network, such as a virtual local area network (VLAN). In such a network, some access points may be partitioned into service sets. A service set is a logical grouping of one or more network service parameters. For example, an IEEE 802.11 Infrastructure Basic Service Set (BSS) is a service set with network parameters for an access point. As another example, an IEEE 802.11 Extended Service Set (ESS) is a set of BSSs, where all the access points communicate to forward traffic from one BSS to another to facilitate movement of endpoint devices between BSSs.

Service parameters in an ESS may be used to differentiate network access for security purposes. Service parameters may control authentication, encryption, network routing, and other similar network service access parameters. For example, "guest" endpoint devices may be restricted to "guest" service sets, and may have a low encryption requirement. As another example, "employee" endpoint devices may be restricted to "employee" service sets, and may have a high encryption requirement.

Although such partition-based assignment may provide differentiated network access, it may severely restrict mobility for devices such as endpoint device 16. For example, a large campus network may contain multiple VLANs that provide equivalent service sets. Endpoint devices attempting to roam between access points may encounter connectivity loss because the access points may be configured with different service parameters.

According to one embodiment of the invention, a system and method are provided that synchronize access points in a wireless network. This is effected by selecting, by a managing device, an access point from a group of discovered access points and marking the access point as the selected access point. After selecting the access point, the access points that form a part of the VLAN of the selected access point are determined. The service parameters of the determined access points are then synchronized across the VLAN by the managing device. Synchronizing the service parameters of access points, by a managing device, simplifies wireless network setup and accommodates seamless roaming of an endpoint device across various access points. Additional details of example embodiments of the invention are described in greater detail below in conjunction with portions of FIG. 1A, FIG. 1B, FIG. 2, and FIG. 3.

According to the illustrated embodiment of the invention, managing device 18 includes a processor 20, a storage device 22, an input device 24, a memory device 25, a communication interface 28, an output device 30, and a service set manager 40.

Processor 20 may refer to any suitable device operable to execute instructions and manipulate data to perform operations for managing device 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 25 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Service set manager 40 may refer to any suitable logic embodied in computer-readable media, and when executed, that is operable to synchronize the service parameters of access points 14. In the illustrated embodiment of the invention, service set manager 40 resides in storage device 22. In other embodiments of the invention, service set manager 40 may reside in memory device 25, or any other suitable device operable to store and facilitate retrieval of data and instructions.

Figure 1B:
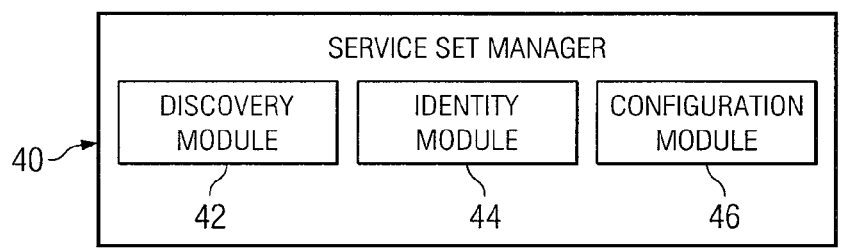
FIG. 1B is a block diagram illustrating an example service set manager of the system of FIG. 1A in accordance with an embodiment of the present invention.

FIG. 1B is a block diagram illustrating an example service set manager 40 of system 10 of FIG. 1A in accordance with an embodiment of the present invention. Service set manager 40 may include various modules operable to perform various functions, including a discovery module 42, an identity module 44, and a configuration module 46.

According to one embodiment of the invention, discovery module 42 may discover access points 14 on the wireless network. For example, device discovery module 42 may discover access points 14 using Internet Control Message Protocol (ICMP). Under ICMP, discovery module 42 may "ping" devices and await replies to determine if a device is operating on the wireless network. As another example, discovery module 42 may discover devices using Simple Network Management Protocol (SNMP). Under SNMP, discovery module 42 can exchange information with devices through messages technically known as protocol date units (PDUs). However, the present disclosure contemplates many types of discovery protocols. Various embodiments may include, some, all, or none of the enumerated protocols.

Discovery module 42 may discover access points 14 periodically according to one embodiment of the invention. For example, discovery module 42 may be configured to "ping" for new or updated access points 14 daily. In other embodiments, discovery module 42 may be configured to discover access points 14 on command. For example, discovery module 42 may be configured to "ping" for new or updated access points 14 on command by an administrator.

According to one embodiment of the invention, identity module 44 may determine a service set identifier (SSID) of a selected access point 14. In certain embodiments, an SSID may refer to a sequence of characters that is the identifier, or name, of a wireless connection. The SSID may be unique across a VLAN. The SSID may be included in the header of packets exchanged within a defined service set. The SSID may be set by a network administrator and, for open wireless networks, the SSID may be broadcast to one or more endpoint devices 16 within range of access point 14.

When multiple wireless VLANs are enabled on access point 14, multiple SSIDs may be created. For example, each SSID may map to a default VLAN ID. Since IEEE 802.11 specifications require that only one SSID be broadcast in the beacons, an access point may broadcast a primary SSID. All other SSIDs configured at the access point are secondary SSIDs and are not broadcast. Therefore, if endpoint device 16 (such as a laptop) sends a probe request with a secondary SSID, access point 14 may respond with a probe response with a secondary SSID.

Identity module 44 may determine an SSID by determining a primary SSID of access point 14. For example, identity module 44 may determine a primary SSID corresponding to a native VLAN ID. A native VLAN ID may refer to a number associated with a default VLAN. For instance, on most network devices the native VLAN ID is 1 indicating a default VLAN. As another example, identity module 44 may determine a primary SSID corresponding to an infrastructure SSID at access point 14. An infrastructure SSID may refer to an SSID that other access points 14 may use to associate to access point 14. As another example, identity module 44 may determine a primary SSID corresponding to a broadcast SSID at access point 14. A broadcast SSID may refer to an SSID that access point 14 broadcasts to endpoint devices 16. As another example, identity module 44 may determine a primary SSID corresponding to the most recently added SSID at access point 14.

According to one embodiment of the invention, identity module 44 may determine a VLAN corresponding to the determined SSID. An access point may store a mapping between an SSID and a VLAN. For example, endpoint device 16 may belong to a "guest" SSID. A "guest VLAN" may be configured for the "guest" SSID in access points 14. Initially, a "guest" endpoint device 16 may be bound to the "guest VLAN" through access point 14. Thereafter, as endpoint device 16 roams, it may desire to be seamlessly bound to its original "guest VLAN," regardless of any new associations with access points 14 in the wireless network.

According to one embodiment of the invention, identity module 44 may identify one or more access points 14 located in the VLAN. In various embodiments, identity module 44 may identify the one or more access points by identifying access points with the same primary SSID of the selected access point. In other embodiments, identity module 44 may identify access points 14 located in the VLAN using SNMP. However, the present disclosure contemplates many types of identification protocols for access points 14. Various embodiments may include, some, all, or none of the enumerated protocols.

According to one embodiment of the invention, configuration module 46 may configure the identified one or more access points to match a plurality of service parameters of the selected access point. The IEEE 802.11 standard defines several service parameters for providing services among endpoint devices 16. For example, a network administrator may define authentication service parameters to control access to a wireless network because wireless networks have limited physical security to prevent unauthorized access. Authentication service parameters provide access control equal to a wired network. Authentication service parameters provide a mechanism for access point 14 to identify endpoint device 16. Without this proof of identity, endpoint device 16 may not be allowed to use the wireless network for data delivery. Endpoint device 16 may use authentication service parameters prior to communicating with another access point 14.

IEEE 802.11 defines various types of authentication service parameters. For example, under open system authentication, endpoint device 16 sends an authentication management frame containing the sending identity. Access point 14 then sends back a frame alerting whether it recognizes the identity of endpoint device 16. As another example, under shared key authentication, each endpoint device 16 receives a secret shared key through a secure channel independent of the IEEE 802.11 network. Access points 14 authenticate endpoint device 16 through shared knowledge of the secret key. Use of shared key authentication requires implementation of encryption, such as WPA.

According to one embodiment of the invention, configuration module 46 may accommodate seamless roaming of endpoint device 16 by synchronizing service parameters, such as authentication service parameters and encryption service parameters, across VLANs. For example, endpoint device 16 may belong to a SSID "guest" using WPA with its access point 14. Thereafter, as endpoint device 16 roams, it may desire to be seamlessly connected to its original "guest VLAN," regardless of any new associations with access points 14 in the wireless network. Therefore, configuration module 46 may synchronize other access points 14 to use the same authentication service parameters as the selected access point 14 to achieve seamless integration for wireless network device 16.

Figure 2:
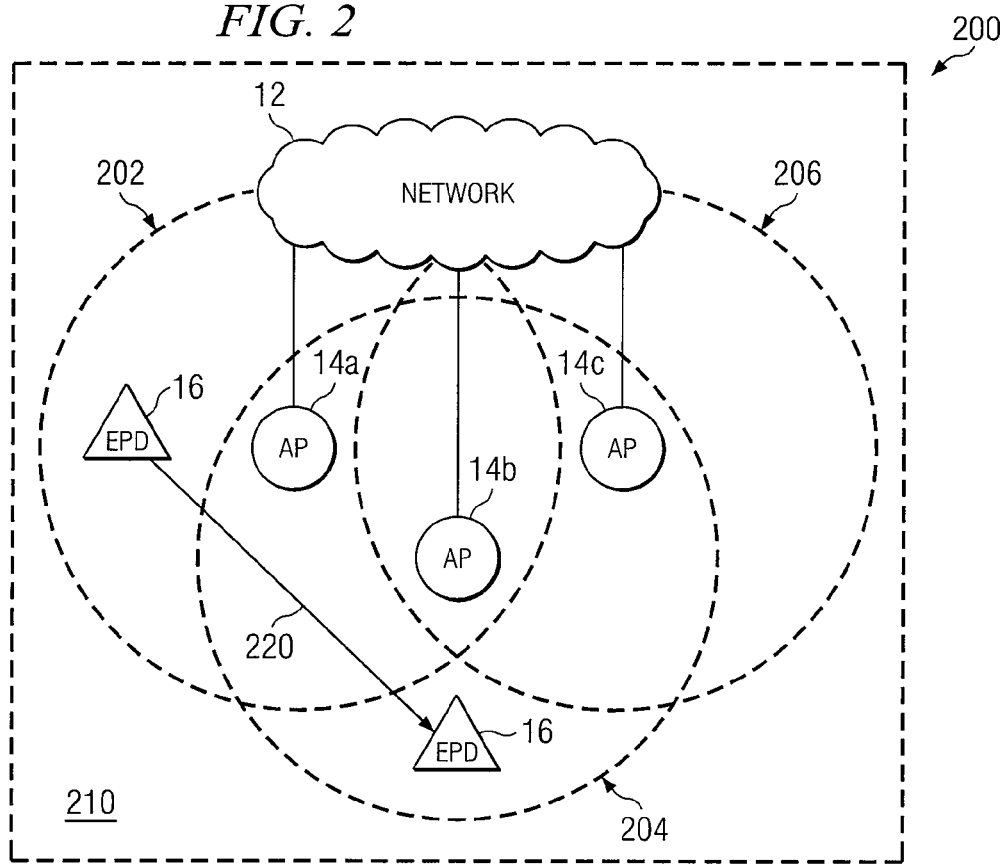
FIG. 2 is a block diagram illustrating example service sets of the system of FIG. 1A, according to an embodiment of the invention.

FIG. 2 is a block diagram illustrating example service sets of system 10 of FIG. 1A, according to an embodiment of the invention. As shown in FIG. 2, an ESS 210 comprises three BSSs 202, 204, and 206. Access points 14a, 14b, and 14c control BSS 202, 204, and 206, respectively. Access points 14a, 14b, and 14c may be substantially similar to access point 14 of FIG. 1A.

According to one embodiment of the invention, the service parameters of each of access points 14a, 14b, 14c may be synchronized to ensure that the configuration across access points 14a, 14b, and 14c provides seamless connectivity to endpoint device 16. For example, an authentication attempt may be sent from endpoint device 16 to access point 14a. Access point 14a then attempts to authenticate endpoint device 16 by authenticating the SSID of endpoint device 16. If access point 14a authenticates endpoint device 16, access point 14a then sends a message containing service parameters for endpoint device 16. If endpoint device 16 travels a path indicated by reference number 220 from BSS 202 to BSS 204, BSS 204 must have the same service parameters as BSS 202 to avoid service interruption.

As contemplated by an aspect of the present invention, access point 14b and access point 14c may be synchronized with the service parameters of access point 14a. Because each access point is individually synchronized, when endpoint device 16 is associated with access point 14b it may be bound to the same VLAN with the same service parameters as access point 14a.

Figure 3:
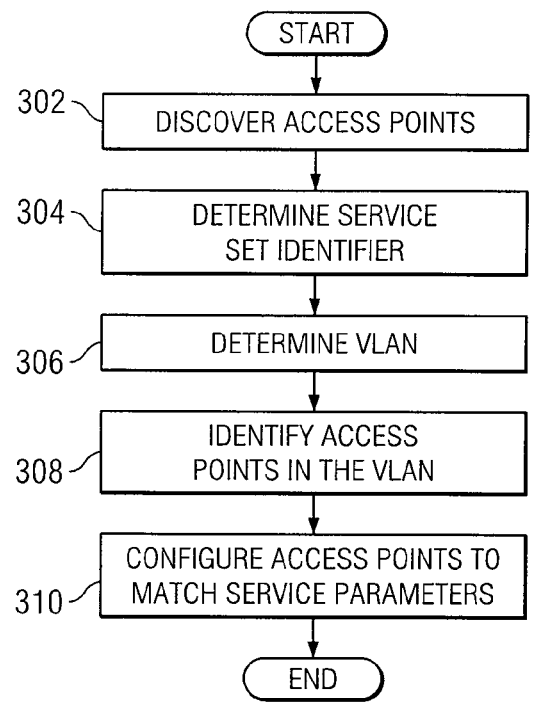
FIG. 3 is a flow chart illustrating example acts associated with a method for synchronizing access points in a wireless network.

FIG. 3 is a flow chart illustrating example acts associated with a method for synchronizing access points in a wireless network. The example acts may be performed by service set manager 40, as discussed above with reference to FIG. 1A and FIG. 1B, or by other suitable device. At step 302, access points may be discovered on the wireless network. For example, access points may be discovered using Internet Control Message Protocol (ICMP). Under ICMP, devices may be "pinged" to determine if a device is operating on the wireless network. Other embodiments may use other methods of discovering access points in the wireless network.

At step 304, an SSID of a selected access point is determined. In particular embodiments of the invention, the SSID may be determined by identifying a primary SSID of the selected access point. For example, a primary SSID may be identified that corresponds to a native VLAN ID at the selected access point. As another example, a primary SSID may be identified that corresponds to an infrastructure SSID at the selected access point. As another example, a primary SSID may be identified that corresponds to a broadcast SSID at the selected access point. As another example, a primary SSID may be identified that corresponds to the most recently added SSID at the selected access point.

At step 306, a VLAN corresponding to the determined SSID may be determined. For example, an access point may store a mapping between an SSID and a VLAN. Thus, an endpoint device may have a "guest" SSID. A "guest VLAN" may be configured for the "guest" SSID in access points in the wireless network. Initially, a "guest" endpoint device may be bound to the "guest VLAN" configured for "guest" in the access point, and therefore the "guest VLAN" may be determined from the "guest" SSID.

At step 308, one or more access points located in the VLAN are identified. In various embodiments, one or more access points may be identified if the one or more access points share the same primary SSID of the selected access point. In other embodiments, access points located in the VLAN may be identified using SNMP. However, the present disclosure contemplates many types of identification protocols to identify access points and various embodiments may include, some, all, or none of the enumerated protocols.

At step 310, the identified one or more access points are configured to match a plurality of service parameters of the selected access point. For example, the IEEE 802.11 standard defines service parameters for providing services among endpoint devices. Endpoint device services may be configured with security and data delivery parameters when entering the wireless network. Seamless roaming of endpoint devices may be accomplished by synchronizing service parameters, such as authentication service parameters and encryption service parameters, across VLANs. For example, an endpoint device may belong to a "guest" SSID using WPA with its access point. Thereafter, as the endpoint device roams, it may desire to be seamlessly bound to its original "guest VLAN," regardless of any new associations with access points in the wireless network. Therefore, by synchronizing other access points to use the same authentication service parameters as the selected access point, the endpoint device may seamlessly roam the wireless network.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for synchronizing access points in a wireless network, comprising:
    discovering, by a managing device, a plurality of access points in a wireless network;
    selecting, by the managing device, an access point from the plurality of discovered access points to be a selected access point;
    determining, by the managing device, a service set identifier of the selected access point in the wireless network, the service set identifier identifying a name of a wireless connection, the selected access point having a first plurality of service parameters, wherein the first plurality of service parameters comprises a plurality of parameters, wherein at least one parameter is selected from the group consisting of: an authentication parameter, an encryption parameter, and a network routing parameter;
    determining, by the managing device, a virtual local area network (VLAN) corresponding to the determined service set identifier of the selected access point, the VLAN located in an extended service set, the extended service set comprising a plurality of basic service sets;
    identifying, by the managing device, one or more access points other than the selected access point located in the determined VLAN, the one or more identified access points in the determined VLAN each having a respective second plurality of service parameters;
    configuring, by the managing device, each second plurality of service parameters of the one or more access points other than the selected access point to match the first plurality of service parameters of the selected access point; and
    providing seamless roaming of an endpoint device using the matched first plurality of service parameters.

2. The method of claim 1, wherein determining, by the managing device, the service set identifier of the selected access point comprises determining, by the managing device, a service set identifier of the selected access point corresponding to a native VLAN.

3. The method of claim 1, wherein determining, by the managing device, the service set identifier of the selected access point comprises determining, by the managing device, a service set identifier of a selected access point corresponding to an infrastructure service set identifier.

4. The method of claim 1, wherein determining, by the managing device, the service set identifier of the selected access point comprises determining, by the managing device, a service set identifier of a selected access point corresponding to a broadcast service set identifier.

5. The method of claim 1, wherein determining, by the managing device, the service set identifier of the selected access point comprises determining, by the managing device, a service set identifier of a selected access point corresponding to a most recently added service set identifier.

6. The method of claim 1, wherein the first plurality of service parameters comprises an authentication parameter.

7. The method of claim 1, wherein the first plurality of service parameters comprises an encryption parameter.

8. The method of claim 1, wherein the first plurality of service parameters comprises a network routing parameter.

9. A system for synchronizing access points in a wireless network, comprising:
a plurality of access points in the wireless network; and
a managing device operable to connect to the wireless network, the managing device comprising:
a processor; and
a storage device embodying a program of instructions operable, when executed on the processor, to:
select an access point from the plurality of access points to be a selected access point;
determine a service set identifier of the selected access point in the wireless network, the service set identifier identifying a name of a wireless connection, the selected access point having a first plurality of service parameters, wherein the first plurality of service parameters comprises a plurality of parameters, wherein at least one parameter is selected from the group consisting of: an authentication parameter, an encryption parameter, and a network routing parameter;
determine a virtual local area network (VLAN) corresponding to the determined service set identifier of the selected access point, the VLAN located in an extended service set, the extended service set comprising a plurality of basic service sets;
identify one or more access points other than the selected access point located in the determined VLAN, the one or more identified access points in the determined VLAN each having a respective second plurality of service parameters;
configure each second plurality of service parameters of the one or more access points other than the selected access point to match the first plurality of service parameters of the selected access point; and
provide seamless roaming of an endpoint device using the matched first plurality of service parameters;
wherein the first and second plurality of service parameters are operable to differentiate access to the wireless network for security purposes.

10. The system of claim 9, wherein the program is further operable to determine the service set identifier of the selected access point by determining a service set identifier of the selected access point corresponding to a native VLAN.

11. The system of claim 9, wherein the program is further operable to determine the service set identifier of the selected access point by determining a service set identifier of a selected access point corresponding to an infrastructure service set identifier.

12. The system of claim 9, wherein the program is further operable to determine the service set identifier of the selected access point by determining a service set identifier of a selected access point corresponding to a broadcast service set identifier.

13. The system of claim 9, wherein the program is further operable to determine the service set identifier of the selected access point by determining a service set identifier of a selected access point corresponding to a most recently added service set identifier.

14. The system of claim 9, wherein first plurality of service parameters comprises an encryption parameter.

15. The system of claim 9, wherein the first plurality of service parameters comprises an authentication parameter.

16. A non-transitory computer-readable medium encoded with logic, the logic being operable, when executed on a processor, to: discover a plurality of access points in a wireless network;
select an access point from the plurality of discovered access points to be a selected access point;
determine a service set identifier of the selected access point in the wireless network, the service set identifier identifying a name of a wireless connection, the selected access point having a first plurality of service parameters, wherein the first plurality of service parameters comprises a plurality of parameters, wherein at least one parameter is selected from the group consisting of: an authentication parameter, an encryption parameter, and a network routing parameter;
determine a virtual local area network (VLAN) corresponding to the determined service set identifier of the selected access point, the VLAN located in an extended service set, the extended service set comprising a plurality of basic service sets;
identify one or more access points other than the selected access point located in the determined VLAN, the one or more identified access points in the determined VLAN each having a respective second plurality of service parameters;
configure each second plurality of service parameters of the one or more access points other than the selected access point to match the first plurality of service parameters of the selected access point; and
provide seamless roaming of an endpoint device using the matched first plurality of service parameters;
wherein the first and second plurality of service parameters are operable to differentiate access to the wireless network for security purposes.

17. The non-transitory computer-readable medium of claim 16, wherein the logic operable to determine the service set identifier of the selected access point comprises the logic operable to determine a service set identifier of the selected access point corresponding to a native VLAN.

18. The non-transitory computer-readable medium of claim 16, wherein the logic operable to determine the service set identifier of the selected access point comprises the logic operable to determine a service set identifier of a selected access point corresponding to an infrastructure service set identifier.

19. The non-transitory computer-readable medium of claim 16, wherein the logic operable to determine the service set identifier of the selected access point comprises the logic operable to determine a service set identifier of a selected access point corresponding to a broadcast service set identifier.

20. The non-transitory computer-readable medium of claim 16, wherein the logic operable to determine the service set identifier of the selected access point comprises the logic operable to determine a service set identifier of a selected access point corresponding to a most recently added service set identifier.

21. The non-transitory computer-readable medium of claim 16, wherein the first plurality of service parameters comprises an encryption parameter.

22. The non-transitory computer-readable medium of claim 16, wherein the first plurality of service parameters comprises an authentication parameter.

\* \* \* \* \*